July 3, 1962

L. NORRIS 3,042,118

SUBSOILER

Filed June 18, 1959

INVENTOR
LEONARD NORRIS

BY *Charles L. Lavercheck*
ATTORNEY

July 3, 1962   L. NORRIS   3,042,118
SUBSOILER
Filed June 18, 1959   2 Sheets-Sheet 2
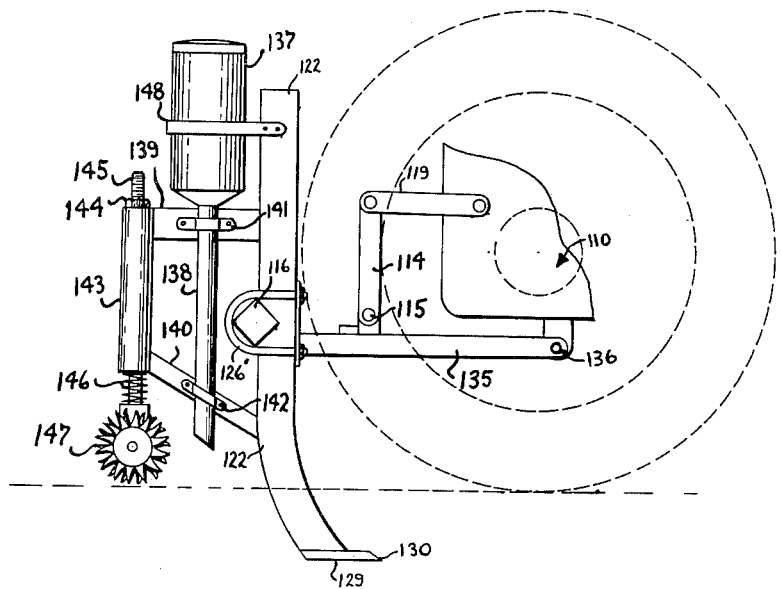
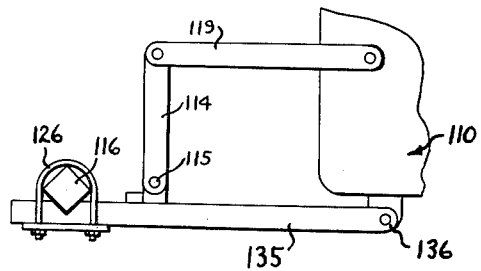
INVENTOR.
LEONARD NORRIS
BY
Charles L. Lovercheck
ATTORNEY

United States Patent Office 3,042,118
Patented July 3, 1962

3,042,118
SUBSOILER
Leonard Norris, Reinbeck, Iowa
Filed June 18, 1959, Ser. No. 821,212
2 Claims. (Cl. 172—1)

This invention relates to subsoilers and, more particularly, to machines for cultivating soil between row crops to a depth greater than the depth ordinarily penetrated by the usual cultivating machines.

In subsoilers which have commonly been in use, it has been the practice to utilize a single cutting blade drawn by a powerful tractor and the subsoiling is done before the ground is tilled. Then after the ground has been plowed, harrowed, disked, and otherwise put into condition for a seed bed and the seed planted, the soil has been run over and packed by the tractor wheels a number of times and it has been packed to almost as hard a consistency as before it was originally plowed.

The problem commonly known as "compacted soil" has been discussed in many publications. It has been common practice to "subsoil" the ground with an ordinary subsoiler such as shown in Patent No. 2,786,404 before the ground is plowed. This loosens the ground temporarily but, subsequently during preparation of the seed bed and before the crop is planted, tractor wheels usually run over the soil several times. After planting, the soil is again compacted by the tractor wheels during cultivation. This compaction which results after planting can only be broken up by a subsoiler after planting and, to be most effective, after the tractor has been over the ground the final time after the last cultivation wherein the blades are set to run behind each tractor wheel. When this is done, the soil is loosened deeply and all rain water which would ordinarily run off is held in the loose soil. Further, since the rain water does not run off but, rather, soaks in, the soil will not be subjected to such violent erosion as when the ordinary shallow cultivation is used last.

The present invention contemplates the use of three blades, each to run between two rows of row crops such as corn and to a depth greater than the depth penetrated by the ordinary cultivator blade.

It is, accordingly, an object of the present invention to provide an improved subsoiling machine.

Another object of the invention is to provide an improved subsoiling machine which can be supported on the conventional draw bar and lifting arrangement of a tractor.

Still another object of the invention is to provide a subsoiler wherein one blade enters the soil behind each wheel of the tractor.

A further object of the invention is to provide a subsoiler for use with row crops wherein one subsoiler blade operates between each three rows to be cultivated.

A still further object of this invention is to provide a subsoiler which operates on a mechanism similar to the conventional tractor cultivator hitch.

Yet a further object of the invention is to provide a subsoiler which is economical to manufacture, simple in construction, and simple and efficient to operate.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 3 is a view of another embodiment of the invention; and

FIG. 4 is a view similar to that shown in FIG. 3 but with the attachments removed.

Figure 1:
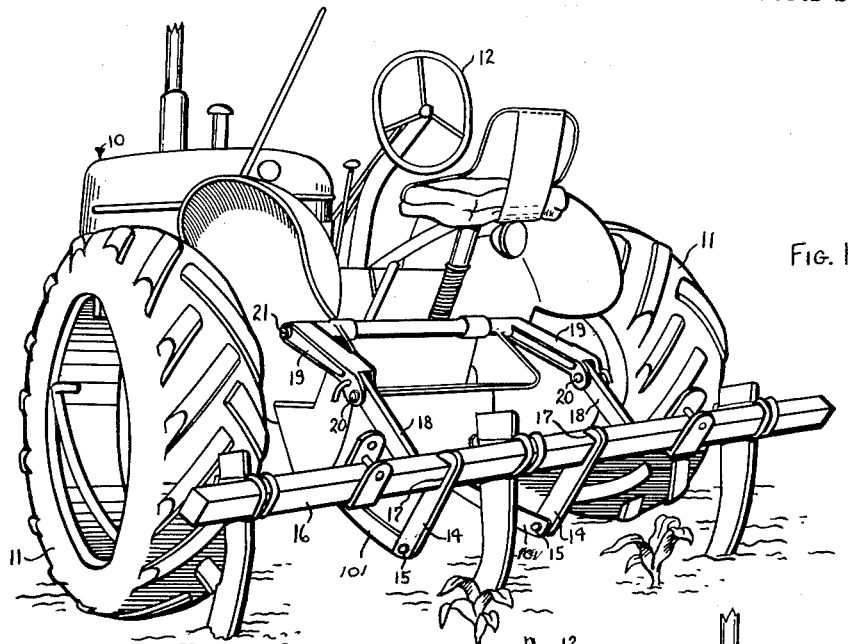
FIG. 1 is a view of a subsoiler according to the invention with the blades thereof inserted in the ground.
Figure 2:
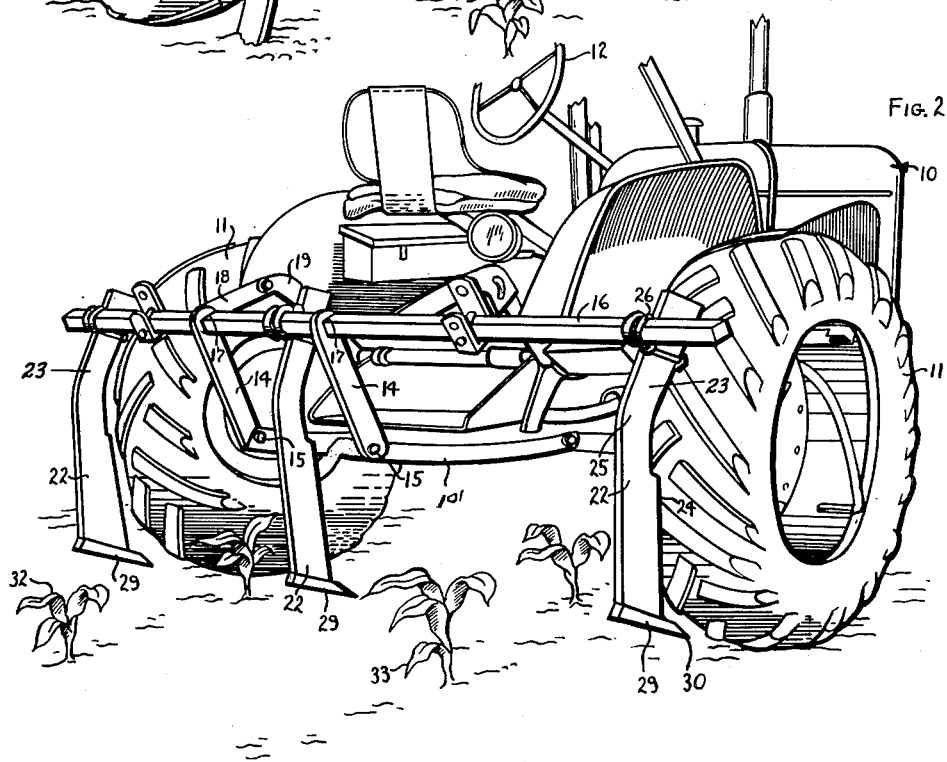
FIG. 2 is a view of the subsoiler with the blades lifted to transporting position.

Now with more particular reference to the drawings, a tractor 10 is shown having usual ground engaging wheels 11 and a steering wheel 12. The tractor 10 has a hitch arrangement made up of links 14 which are pivotally connected to the tractor link 101 at 15. The distal ends of the links 14 are attached to a square shaft 16 at 17. Arms 18 are fixed to the square shaft 16 and the distal ends of the arms 18 are pivotally connected to cranks 19 at 20. The cranks 19 are connected to the crank of the hydraulic system of the tractor 10 and are driven by power from the tractor engine to rotate around their pivot axis 21 so that when the cranks 19 are swung to the position shown, they force blades 22 to enter the ground. Then when the cranks 19 are swung to the position shown in FIG. 2, they lift the subsoiler blades 22 out of the ground.

The subsoiler blades 22 have flat plate like portions 23 which have a sharpened blade like cutting surface 24 on the front edge thereof curved upwardly and forwardly at 25. The portions 23 are attached by U-shaped bolts 26 to the square shaft 16. Cutting shoes 29 are welded to the lower ends of the blades 22. The cutting shoes 29 are wedge shaped and terminate at a downwardly and forwardly extending point 30 at the forward edge so that the cutting edge of the point 30 will pull the cutting shoes 29 into the ground.

It will be seen that one of the blades 22 is disposed behind each wheel 11 of the tractor 10 and one between rows 32 and 33 of corn as shown. Therefore, the blades 22, which will run to a depth of some twelve to fourteen inches, for example, will loosen the soil to at least the depth to which it has been plowed and will, therefore, loosen the subsoil.

In the embodiment of the invention shown in FIGS. 3 and 4, cranks 119 are attached to the gear box of a tractor 110 and are controlled therefrom. Links 114 are pivotally connected to the cranks 119 at their upper ends and are connected at their lower ends to lever arms 135. The lever arms 135 are swingably connected to the underside of the gear box at 136.

Located in a notch and on the upper surface of the distal ends of the lever arms 135 is a square attachment bar 116 which is rigidly held thereon by U-bolts 126. The attachment bar 116 can be raised or lowered by the operator of the tractor 110 through the conventional hydraulic system thereof.

Attached to the inner side of the attachment bar 116 are subsoiler blades 122 which each have a notch in the rear side thereof. These notches receive the bar 116 and the subsoiler blades 122 are rigidly held thereon by U-bolts 126'. The subsoiler blades 122 are shown in their down position with a cutting shoe 129 and a point 130 inserted in the ground below the dotted line indicating the level thereof.

A rotary hoe 147 is shown having an adjusting shaft 145 passing through a bearing 143. The rotary hoe 147 is attached to the lower end of the adjusting shaft 145. The depth to which the rotary hoe 147 will run is controlled by a lock nut 144 on the threads of the adjusting shaft 145. A spring 146 is supported between the bearing 143 and a block supporting the rotary hoe 147 and the spring 146 urges the rotary hoe 147 into the ground.

The bearing 143 is attached rigidly to the blade 122 by brackets 139 and 140. A receptacle 137 which may receive fertilizer is located above the bracket 139. A clamp 148 attaches the receptacle 137 to the upper distal end of the subsoiler blade 122. The receptacle 137 has a conical shaped bottom which is received in the open upper end of a discharge chute 138. The discharge chute 138 is firmly attached to the brackets 139 and 140 by clamps 141 and 142.

In operation, the subsoiler blade 122 will be forced into the ground to a considerable depth and to the "subsoil" which will loosen the soil. The fertilizer which flows down the discharge chute 138 from the receptacle 137 will enter the opening left by the blade 122. The rotary hoe 147 will pulverize the loosened soil and mix fertilizer with the soil. Some fertilizer will penetrate deeply.

It has been discovered and proved by experiment that subsoilers such as that shown herein, when used in cultivating corn, will increase the yield appreciably because the soil is loosened by the subsoiler to a depth below the depth which is normally penetrated by cultivating.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of tilling the soil comprising preparing a seed bed for a row crop, planting said row crop, and then subsoiling said soil during the time the crops are growing by drawing a blade through said soil between each said row to a greater depth than that of ordinary plowing and into the subsoil.

2. A method of raising row crops comprising preparing a seed bed for a row crop, planting said row crop, then subsoiling the soil between each row of said row crop to a greater depth than the depth penetrated by that of ordinary plowing and into the subsoil, and then pulverizing the soil on the surface between said rows.

References Cited in the file of this patent
UNITED STATES PATENTS

| | | |
|---|---|---|
| 376,674 | Nowell et al. | Jan. 17, 1888 |
| 688,551 | Selby | Dec. 10, 1901 |
| 1,073,984 | Hartig | Sept. 23, 1913 |
| 1,814,003 | Lown | July 14, 1931 |
| 2,321,464 | Cook | June 8, 1943 |
| 2,357,848 | Ray | Sept. 12, 1944 |
| 2,401,139 | Cook | May 28, 1946 |
| 2,598,121 | Hannibal | May 27, 1952 |
| 2,683,403 | Flentie | July 13, 1954 |
| 2,786,404 | Gardner | Mar. 26, 1957 |
| 2,931,446 | Gwinn | Apr. 5, 1960 |

FOREIGN PATENTS

| | | |
|---|---|---|
| 135,705 | Great Britain | Dec. 4, 1919 |